(12) United States Patent
Klevatt et al.

(10) Patent No.: US 11,902,688 B2
(45) Date of Patent: *Feb. 13, 2024

(54) PERFLESS AND CADENCELESS SCANNING AND DIGITIZATION OF MOTION PICTURE FILM

(71) Applicant: WARNER BROS. ENTERTAINMENT INC., Burbank, CA (US)

(72) Inventors: Steven Craig Klevatt, Los Angeles, CA (US); Michael Charles Borquez, Lancaster, CA (US); Christopher Eugene Gillaspie, Duarte, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,837

(22) Filed: Jul. 1, 2022

(65) Prior Publication Data
US 2023/0015248 A1    Jan. 19, 2023

Related U.S. Application Data

(63) Continuation of application No. 17/094,807, filed on Nov. 10, 2020, now Pat. No. 11,381,713.

(51) Int. Cl.
*H04N 3/38* (2006.01)
*G06F 9/448* (2018.01)

(52) U.S. Cl.
CPC ............. *H04N 3/38* (2013.01); *G06F 9/4498* (2018.02)

(58) Field of Classification Search
CPC ... H04N 3/36; H04N 3/38; H04N 3/40; G06F 9/4498
See application file for complete search history.

(56) References Cited

U.S. PATENT DOCUMENTS

| 2,818,467 A | 12/1957 | Harris et al. |
| 4,054,918 A | 10/1977 | Kamogawa et al. |

(Continued)

FOREIGN PATENT DOCUMENTS

| CN | 108765485 A | 11/2018 |
| CN | 113064674 A | 7/2021 |

(Continued)

OTHER PUBLICATIONS

K. Gusev, "Image unsteadiness correction in archive film scanners," 2013 IEEE International Conference on Consumer Electronics (ICCE), Las Vegas, NV, USA, 2013, pp. 118-120, doi: 10.1109/ICCE.2013.6486821. (Year: 2013).*

(Continued)

*Primary Examiner* — Michael Robert Cammarata
(74) *Attorney, Agent, or Firm* — Bookoff McAndrews PLLC

(57) ABSTRACT

Motion picture film is scanned by high-resolution, continuous sprocketless scanner, producing a first sequence of digital images each representing a plurality of motion picture frames and perforations (perfs) of the film input. The first sequence of images is processed using a processor running an analysis and extraction algorithm, producing a second sequence of images each including a single, edge-stabilized frame of the motion picture.

20 Claims, 6 Drawing Sheets

(56) References Cited

U.S. PATENT DOCUMENTS

| | | | |
|---|---|---|---|
| 5,943,090 | A | 8/1999 | Eiberger et al. |
| 6,124,885 | A | 9/2000 | Mooney et al. |
| 6,169,571 | B1 | 1/2001 | Rivers et al. |
| 8,681,213 | B1 | 3/2014 | Demetrescu |
| 9,661,236 | B2 | 5/2017 | Howell |
| 11,199,715 | B2 | 12/2021 | Van Heugten |
| 2003/0011748 | A1 | 1/2003 | Varian |
| 2010/0149328 | A1 | 6/2010 | Cieslinski |
| 2013/0076890 | A1 | 3/2013 | Bovee |
| 2018/0309905 | A1 | 10/2018 | Clarke |
| 2020/0294497 | A1 | 9/2020 | Kirazci et al. |
| 2021/0165907 | A1 | 6/2021 | Mann et al. |
| 2021/0361804 | A1 | 11/2021 | Schmitt et al. |

FOREIGN PATENT DOCUMENTS

| | | |
|---|---|---|
| EP | 1162821 A1 | 12/2001 |
| EP | 2200269 A1 | 6/2010 |
| EP | 3393116 A1 | 7/2021 |
| JP | 2004023795 | 1/2004 |

OTHER PUBLICATIONS

W. E. Gephart, "The Use of 35/32mm Films for the Production of 16mm Black-and-White or Color Prints," in Journal of the SMPTE, vol. 66, No. 3, pp. 97-100, Mar. 1957, doi: 10.5594/J17521. (Year: 1957).

M. Senge, "Advancements in Film Scanning Technologies," in SMPTE Motion Imaging Journal, vol. 119, No. 8, pp. 47-52, Nov.-Dec. 2010, doi: 10.5594/J17297. (Year: 2010).

* cited by examiner

A = 07.605mm 0.2994" (16mm Image Height)
B = 10.490mm 0.4130" (16mm Image width)
C = 26.442mm 1.0410" (Film Width Between Perfs)
D = 31.900mm 1.2559" (Film Width Edge to Edge)
E = 01.829mm 0.0720" (Perf Width)
F = 01.270mm 0.0500" (Perf Height)
G = 00.902mm 0.0355" (Edge of Film to Edge of Perf)
H = 15.950mm 0.6280" (Center of Film to Edge of Film)

PERFLESS AND CADENCELESS SCANNING AND DIGITIZATION OF MOTION PICTURE FILM

CROSS-REFERENCE TO RELATED APPLICATIONS

The present application is a continuation of U.S. patent application Ser. No. 17/094,807, filed Nov. 10, 2020, the disclosure of which is incorporated herein by reference.

FIELD

The present application relates to digitization of analog media, and more particularly to systems, apparatus and methods for perfless and/or cadenceless scanning and digitization of motion picture film.

BACKGROUND

Many commercial motion pictures are filmed in 35 mm film and digitized later. In addition, pre-digital film archives exist only in film analog form until scanned and digitized. Many older titles exist as two side-by-side 16 mm columns on a single 32 mm wide piece of film stock, sometimes referred to as a two-column format or 35/32 internegative.

The unique characteristics of 35/32 internegative poses several challenges to digital input and scanning. For example, the unusual 32 mm width (8 mm/16 mm/35 mm/65 mm are most typical) and the mismatched 16 mm perforation ("perf") height means that standard 35 mm input techniques cannot be used. In theory, a 32 mm internegative could be vertically slit to make two standard 16 mm elements but this too is undesirable. A 32 mm wide substrate is much more durable for archiving than is a 16 mm one, due to its greater width. Also, archivists generally prefer elements to be as raw as possible and to be preserved in an original state if feasible. Splitting the element vertically will negate the archival advantage of having two identical copies of the exact same content on a single substrate. Having two identical elements on a single film strip is also advantageous to a scanning operator if any perf or edge damage is detected. In case of damage, an operator can simply scan in the undamaged side after advancing the 35/32 element to its end and using the takeup reel as a new source instead. Thus, keeping an original 35/32 mm substrate intact while extracting frame content is preferred.

Original camera negative (OCN) for movies made over forty years ago may be lost or may be of such poor quality that frame extraction may be not possible. If available a 35/32 internegative element could be scanned in instead as a replacement or substitute for frames, but the mismatched film substrate width (32 mm) and perf frame height (16 mm) of 35/32 source is an issue. So too is the fact that scans must be sufficiently large enough to be archived. In addition, the film transport speed—the constant stepper motor advance length of film through the scanner gate—does not adhere to any of the typical 8 mm/16 mm/35 mm/65 mm settings. Finally, there are multiple frame registration and stabilization issues that need to be addressed.

Current methods for scanning 35 mm film have drawbacks when attempting with 35/32 source, for example:

Edge guiding uses the edges of film along with a scanner's constant transport speed to advance film exactly one frame at a time. But 35/32 frames don't extend to the frame edge and don't fill an entire frame so this method can't be used. Edge guiding is also quite inaccurate if any film weave or shrinkage is present, or in the case(s) where film edges are damaged.

Mechanical pin registration forces metal pins up through film perfs in order to securely lock film into place as it is being transported through a scanner's film gate. But 35/32 frames are too wide for standard 16 mm perfs and their associated settings. This method also gives inconsistent results with warped, shrunken or perf damaged film.

Optical pin registration uses multiple sensors and software to locate film perforations and then registers and stabilizes scanned-in images accordingly. This technique, however, relies on a single image being entirely contained within perfs left and right and on a standardized motor film transport speed, neither of which condition is satisfied during the capture of 35/32 internegative.

It would be desirable, therefore, to develop new methods and other new technologies for scanning motion picture film, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

Ultimately the solution provided herein satisfies all of the above concerns via a perfless and cadenceless methodology for 35/32 mm internegative that is simple for a scanning operator to calibrate, follow and run. It has also been successfully used to recover frames from a previously unsalvageable 35/32 internegative, a 1946 Warner Brothers title named "Sunbonnet Sue".

In an aspect of the disclosure, a method for obtaining a digital image sequence from analog motion picture film, the method includes scanning the motion picture film by a sprocketless scanner, thereby obtaining a digital image sequence and saving the digital image sequence in a computer memory. In an aspect, the sprocketless scanner has a scanning window per image larger than a frame size of the motion picture film. In another aspect, the scanning window includes at least one row of perfs alongside at least one row of full frames.

In a related aspect, a method for processing the image sequence output by the sprocketless scanner may include accessing, by at least one processor, a digital image sequence produced by a sprocketless film scanner from motion picture film in a computer memory, wherein images in the sequence include a plurality of frames. The method may further include determining, by the at least processor, a count of perfs and perf image positions in each of the images. The method may further include analyzing, by the at least one processor, each of the images using a finite state machine, wherein the analyzing comprises assigning one of a finite number of image states to the each of the images, based at least in part on the count and perf image positions in the each of the images. The method may further include extracting, by the at least one processor, at least one frame of the motion picture from the each of the images, based at least in part on the image states assigned by the analyzing to the each of the images, and preparing a sequence of frames extracted by the extracting sequenced according to the motion picture film. The method may include saving the sequence of frames in a computer memory.

In related aspects, the processing method may further include stabilizing a common edge of every frame in the sequence of frames. The stabilizing may include determining an edge of the extracted frame based on an analysis of an adjacent perf edge.

The determining operation of the method may include analyzing a curve of average pixel values generated by averaging pixel values over a rolling sample window. For example, the at least one processor may identify perf locations corresponding to minima of the average pixel values. The at least one processor may locate the rolling window relative to the width of the motion picture film at least in part based on an immediately prior one of the each of the images.

In another aspect of the method, which frame is extracted from each image depends on which of the image states is assigned to each image by the analyzing. In other words, the at least one processor determines which frame or frames to extract from each image based on the state of the image. In the described embodiment, only four image states are needed.

The processing operation may be performed by any suitable client or server device including a memory. The scanning may be performed by any suitable high-resolution, continuous scanner able to scan and digitize motion picture film.

As used herein, a "client device" includes at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Figures 1A, 1B:
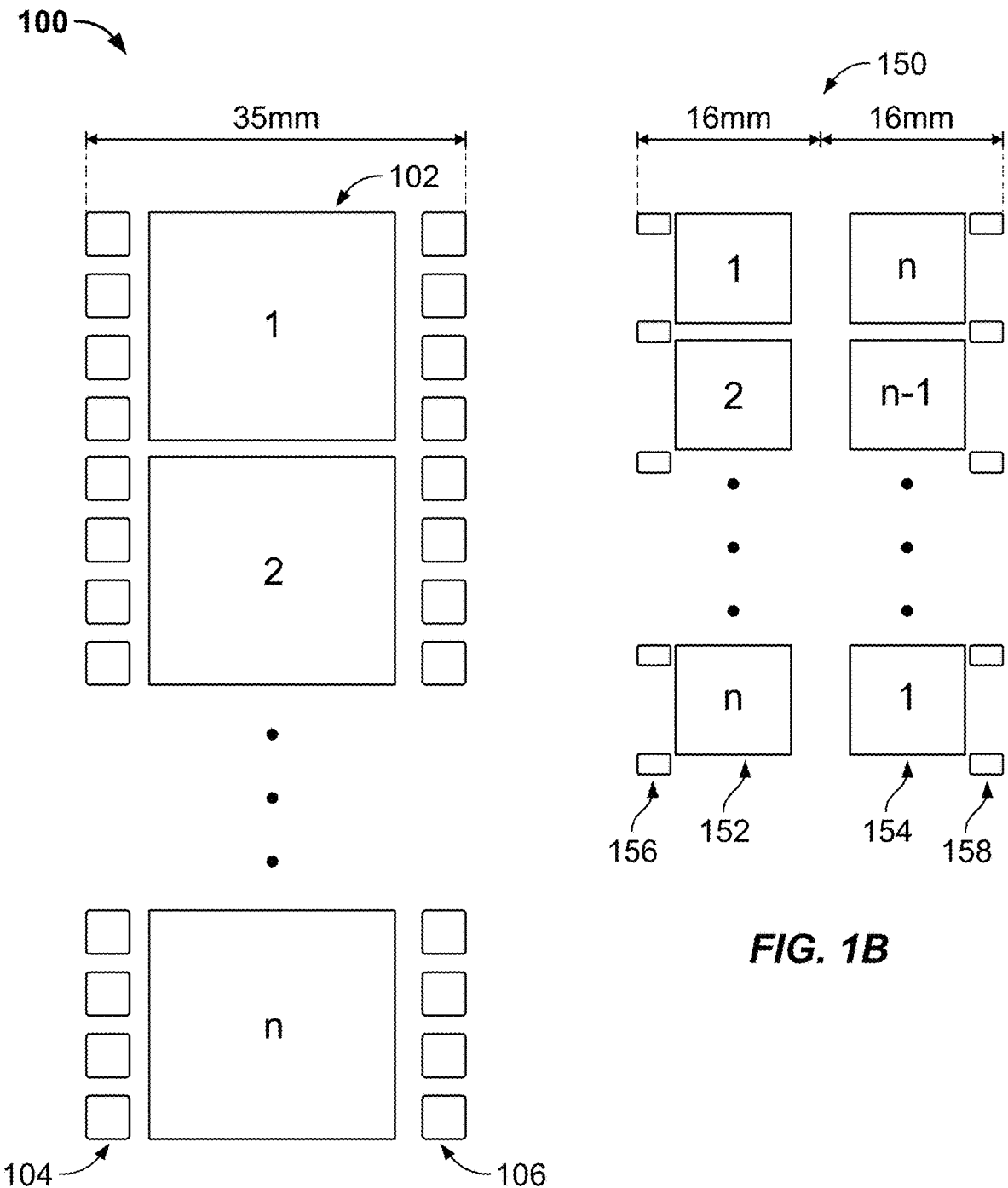
FIG. 1A is a diagram illustrating elements of 35 mm motion picture film.
FIG. 1B is a diagram illustrating elements of 35/32 internegative motion picture film.

Conventional motion picture film 100 format for 35 mm includes four (4) perforations (perfs) 104, 106 per frame edge, running along the height of a single frame 102 as shown in FIG. 1A. A film internegative can be created by capturing frames from original 35 mm film using a system of projectors and a camera (optical printer) which prints the captured frames onto 35 mm wide stock.

For some older titles, the captured frames are exposed as two side-by-side 16 mm columns 152, 154 on a single 32 mm wide piece of film stock 150 as shown in FIG. 1B. Originally the dual exposure was done to save money, as the procedure was faster and used less material than did 35 mm processing. This two column format is now identified as 35/32 internegative and has a frame height of just one perf 156, 158 per frame with a dual set of identical content frames 152, 154 running in opposite directions (reversed, flipped and flopped) down each side of the substrate. The perfs 152, 156 are present on each side of the 35/32 mm internegative, similar to the 35 mm film stock 100. The order of the frames in one of the two 16 mm columns can be reversed as compared to the order of the frames in another one of the two 16 mm columns. The frames of the 35/32 internegative may be reduced in size as compared to the frames of the original 35 mm film. For example, the frames of the internegative 150 are about ⅙th the size of the frames of the original 35 mm film 100.

The 35/32 internegative can be printed faster as compared to the original film and may be more durable as compared to the original film. Thus, the 35/32 internegative can be used to make copies of the film for distribution and/or archiving. However, unique characteristics of 35/32 mm source film 150 provide many challenges to digital input and scanning, as summarized under Background above.

A disadvantage of having both speed and redundancy in a 35/32 format is that the area of each internegative frame is only about a sixth of that of a 35 mm frame. The smaller image area means that digitization of frames requires a much higher resolution scanner to capture digital images comparable in quality to digitized 35 mm film. FIG. 10 shows an example of a 35/32 internegative film 180 with dual frame columns 182, 184 and corresponding perf columns 186, 188 having one perf per frame. Dimensions of various features of the internegative film 180 are designated by the legends 'A' through 'G' at the bottom of the Figure.

Scanning and digitizing 35/32 film stock 180 entails unique challenges, especially for older film stock with imperfections and damage. Original camera negative (OCN) for movies made over forty years ago may be lost or may be of such poor quality that frame extraction may be not possible. If available, a 35/32 internegative element may be scanned instead as a replacement or substitute for the original 35 mm film stock, but the mismatched film substrate width (32 mm) and perf frame height (16 mm) of 35/32 source presents technical challenges. In addition, as noted above, higher-resolution scans are needed to obtain archival-quality frame images comparable to scanning 35 mm film. For example, to obtain a 4000+ pixel-wide image of a dual-column 35/32 film strip, a 10000+ pixel-wide image needs to be captured. In addition, the film transport speed—the constant stepper motor advance length of film through the scanner gate—does not adhere to any of the typical 8 mm/16 mm/35 mm/65 mm settings.

A solution is needed that enables 35/32 frame extraction while accounting for a scan that is independent of the scanner's filmstrip transport speed (cadenceless), wherein each scanned image may contain more than one frame and/or partial frame segments that could have been already scanned in one film advance prior, and wherein the source filmstrip may have damaged perfs on one or both sides of the film, may have frames that are weaving side-to-side, and—due to the non-standard transport speed—will likely have perfs that don't map into a easily calculable and vertically locked pixel position. Operator issues also need to be addressed. For example, initial scanner calibration and setup should be simple and quick, and any film pickups (the rescanning of partial film segments) should also be flexible enough to allow for scans to be restarted anywhere in a film reel.

Figure 2:
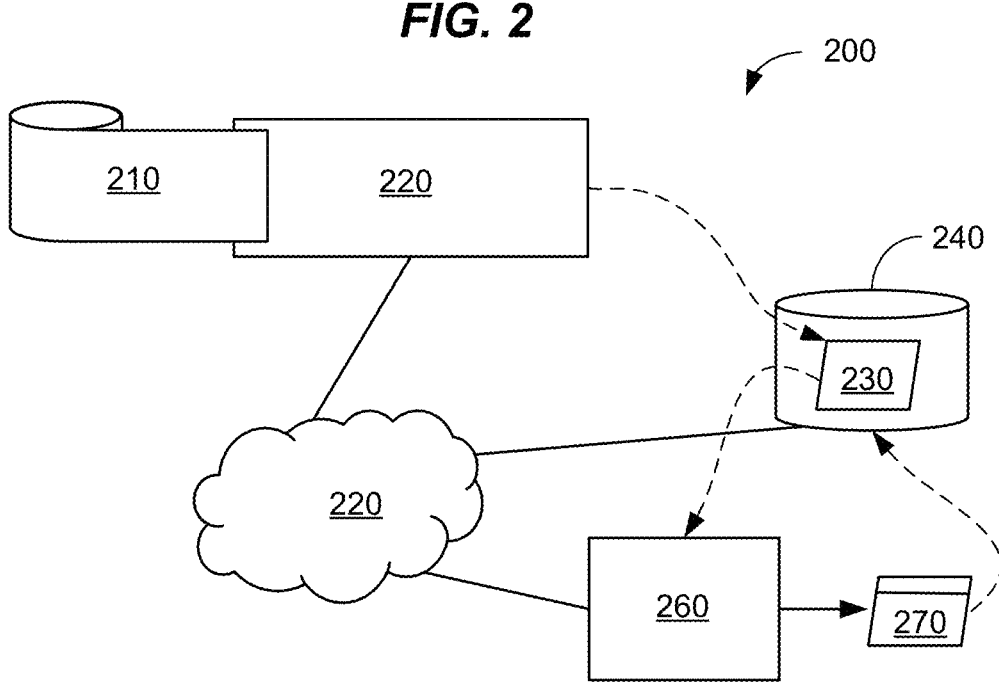
FIG. 2 is a diagram illustrating a system for scanning motion picture film and processing the scanner output to obtain a stabilized image sequence.

Referring to FIG. 2, a system 200 for performing the present method may use a 10K scanner 220 (e.g., 10,240 pixel width, 7680 pixel height) or equivalent scanner to obtain 4K sized (4400 wide, 3200 pixel tall) images in a stabilized image sequence from a 35/32 internegative 210. The scanner may include a motor with a sprocketless drive (e.g., rubber rollers) to advance the filmstrip through the scanner's optical imaging window, halting the filmstrip advance at periodic intervals to capture the portion of the filmstrip within the imaging window as an image in an image sequence. A first image sequence output by the scanner may be saved in a computer memory 240 for processing by an image processing module 260. The image processing module 260 may be a separate, asynchronous server, or may be incorporated into the scanner 220. If embodied as a server, the module 260 may be coupled to the memory 240 holding the scanner output 230 via a network 220 or by any other suitable communication coupling. The image processing module 260 (also called an image processor) processes the first image sequence 230 using an algorithm as described herein, producing a second, output image sequence 270 in a digital video format or suitable for converting to a digital video format. The system 200 may store the second image sequence 2710 in the memory 240 or other suitable location.

It is desirable for the resolution of the images captured by the scanner 220 to be as close to 4K as possible for archiving purposes. The frame images obtained by a 10K scanner have a size that is about 4400×3200 which is sufficient for archiving. The images obtained by a 4K or a 1K scanner would not have a size that is sufficient for archiving. The 35/32 internegative 210 may be scanned in using a 10K sprocketless optical scanner 220 at a transport speed which has been dialed in to a standard 35 mm speed setting, thereby obviating the need to come up with a new configuration. The setting may minimize scan time while ensuring that no frames are skipped.

The digital output 230 from this scanning is not of frames that completely fill in the scan capture area but instead consist of either one frame interposed between two perfs or two frames between three perfs. No more than two full perfs or three full perfs are guaranteed to occur, however, because a single 3200 pixel frame in a reasonably centered 7680 height scan will not have room for any other full-sized perfs, and a scan with four or more perfs is not possible to fit into a 7680 height imaging window. As used herein, "height" or "vertical" refers to the direction parallel to the length of the filmstrip, and "width" or "horizontal" refers to the direction across the filmstrip perpendicular to the height.

After the scans have been ingested additional image processing steps by the module 260 are used to analyze, extract and stabilize the desired frames and prepare a sequence of frame images. Initially, a processor is used to determine the vertical positioning of each perf in each scan. Then, the processor invokes a finite state machine (FSM) that analyzes only the single current scan and the single previous one (thus minimizing analysis time) to determine whether to grab one or two frames from a single scan. Then, the processor detects horizontal perf positioning in order to generate final stabilized images.

Figure 3:
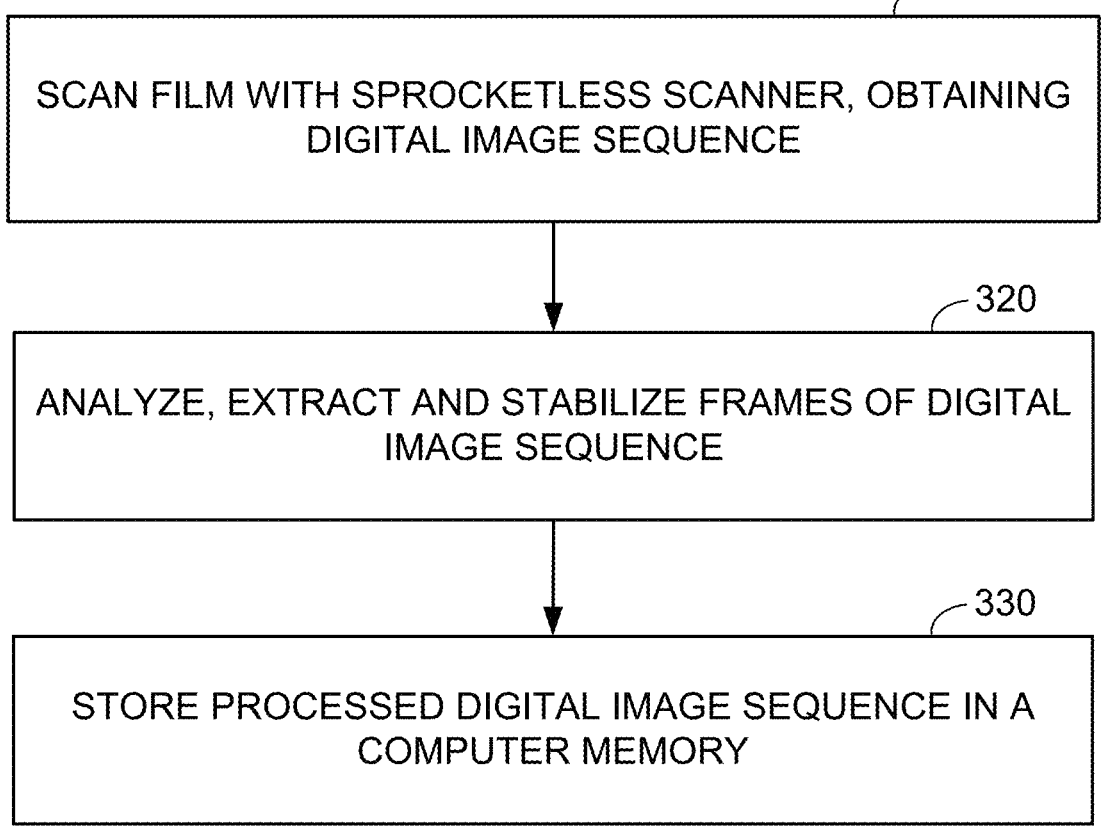
FIG. 3 is a flow chart illustrating aspects of a method for scanning motion picture film and processing the scanner output to obtain a stabilized image sequence.

Initial Scanner Ingest and Calibration: Referring to FIG. 3, a method 300 for perfless and cadenceless scanning may include, at 310, scanning a film strip (e.g., a 35/32 internegative) with a sprocketless scanner, obtaining a digital image sequence. After loading 35/32 film into a sprocketless, high-resolution film scanner an operator may create a set of 10240×7680 sized digital scans subject to only one constraint: the first scan (and first image in the output sequence) needs to contain only two perfs (i.e., one frame only, a condition that actually occurs around 20 percent of the time so is quick enough to realize). The rest of the images can then be scanned sequentially as digital picture exchange (DPX) files and saved to disk for further processing.

The method 300 may further include, at 320, analyzing, extracting and stabilizing frames of a digital image sequence. The processor may determine which frame or frames to extract from a scanned image with multiple frames can be made by knowing which of the four states 1-4 an individual image belongs to. A determination of which state an individual image in the sequence of images captured by the 10K scanner is made by determining the number of perfs and the perf location. An individual perf of the captured image is 428 pixels tall and 616 pixels wide. The height and width of an individual perf of the captured image is about 6% of the height and width respectively of the optical scanner window. Further details regarding such determination are described in connection with method 400, shown in FIG. 4, which expands the image processing operation 320 into constituent parts. At 330, after analyzing, extracting and stabilizing the frame edges, the processor stores the processed digital image sequence in a computer memory. The digital image sequence may be in a PDX or other suitable archiving format, from which compressed video may be generated for distribution.

Figure 4:
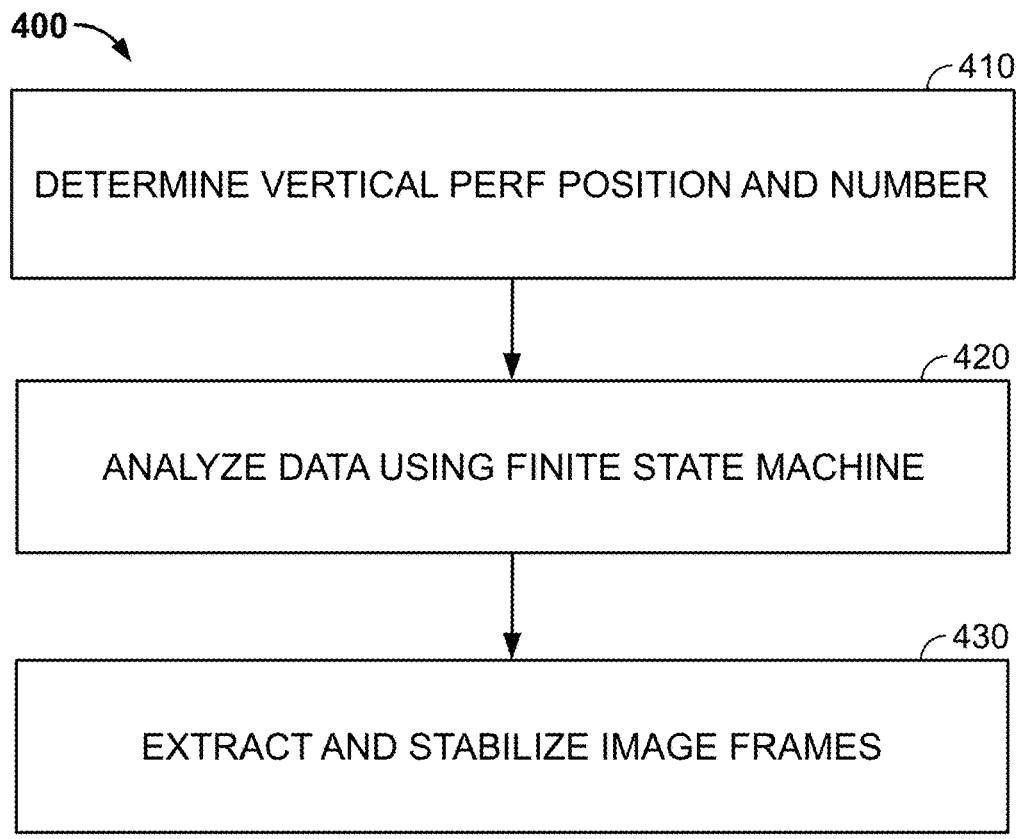
FIG. 4 is a flow chart illustrating further aspects of the method of FIG. 3
Figure 5A:
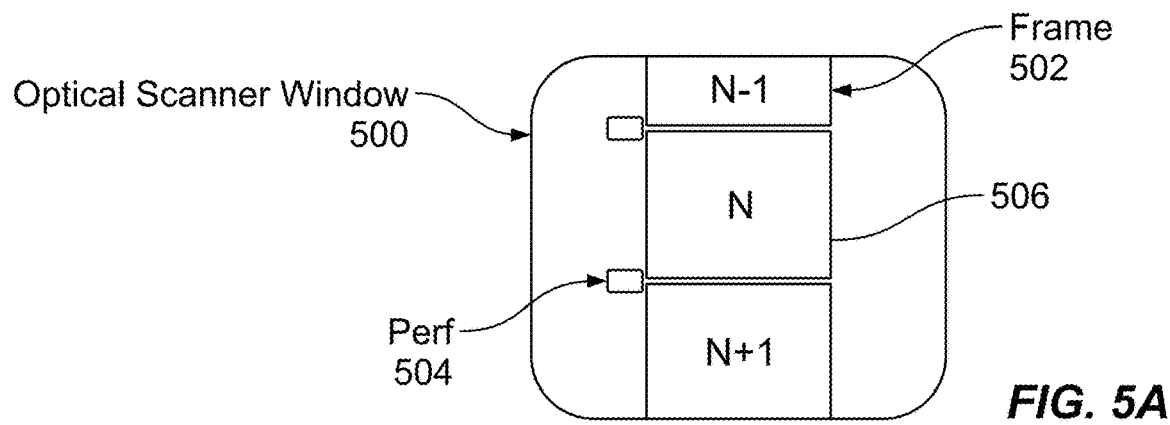
FIGS. 5A-D are schematic diagrams illustrating scanning states analyzed by a state machine.

Image Processing Method: FIG. 4 illustrates a method 400, which may include at least three constituent operations on the raw output of the scanner, each of which includes multiple frame images as described in connection with FIG. 5A below.

In State 1 (FIG. 5A), exactly one full frame 506 is captured within the frameset 502 of the optical scanner window 500. Two full perfs 504 are present, setting off one full frame 506. The remainder of the image 500 frameset 502 consists of partial frames. State 1 is both the reset state for the finite state machine (FSM) and the calibration requirement needed for any original scan or restart.

Figure 5B:
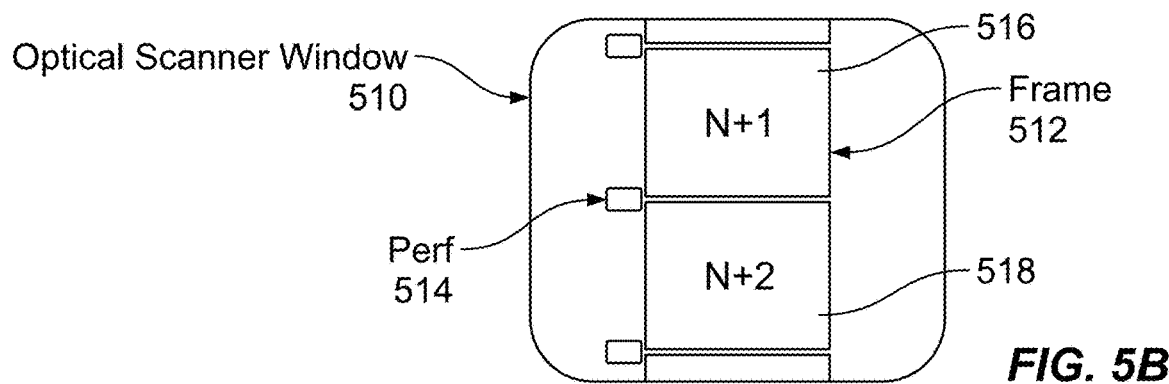

In State 2 (FIG. 5B), exactly two frames 516, 518 are parts of the frameset 512 visible/captured within the optical scanner window 510. Three full perfs 514 are present, with the middle perf being nearly centered within the scan.

Figure 5C:
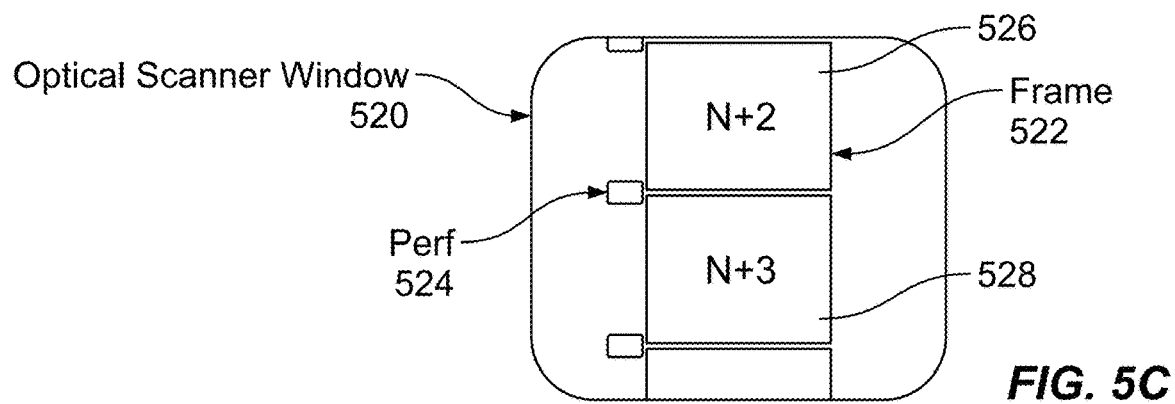
Figure 5D:
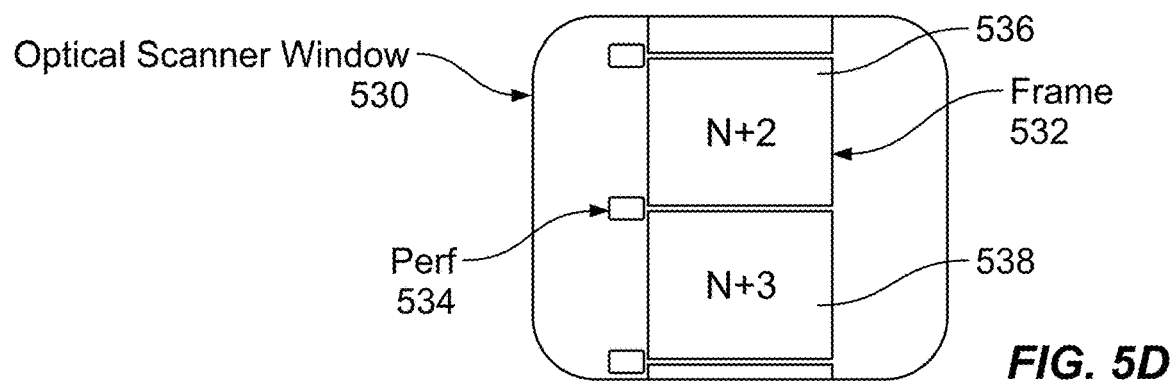

In State 3 (FIG. 5D), exactly two frames 526, 528 are parts of the frameset 522 visible/captured within the optical scanner window 520. Three full perfs 524 are present, but relative to State 2 the perfs have been shifted upward such that the uppermost frame is very near to the top edge edge of the scan and the uppermost perf is (or may be) partial.

In State 4 (FIG. 5C), exactly two frames 536, 538 are parts of the frameset 532 visible/captured within the optical scanner window 530. Three full perfs 534 are present, but relative to State 2 the perfs are shifted downward such that the bottommost frame is very near to the bottom edge of the scan and the bottommost post is (or may be) partial.

Prior to classifying each scanned image into one of four states, the method 400 by the image processor may include accessing, by at least one processor, a digital image sequence produced by a sprocketless film scanner from motion picture film in a computer memory, wherein images in the sequence include a plurality of frames. Then, in an operation 410, the image processor mat determine a count of perfs and perf image positions in each of the scanned images, in sequence, for example using more detailed operations as described below.

Figure 6:
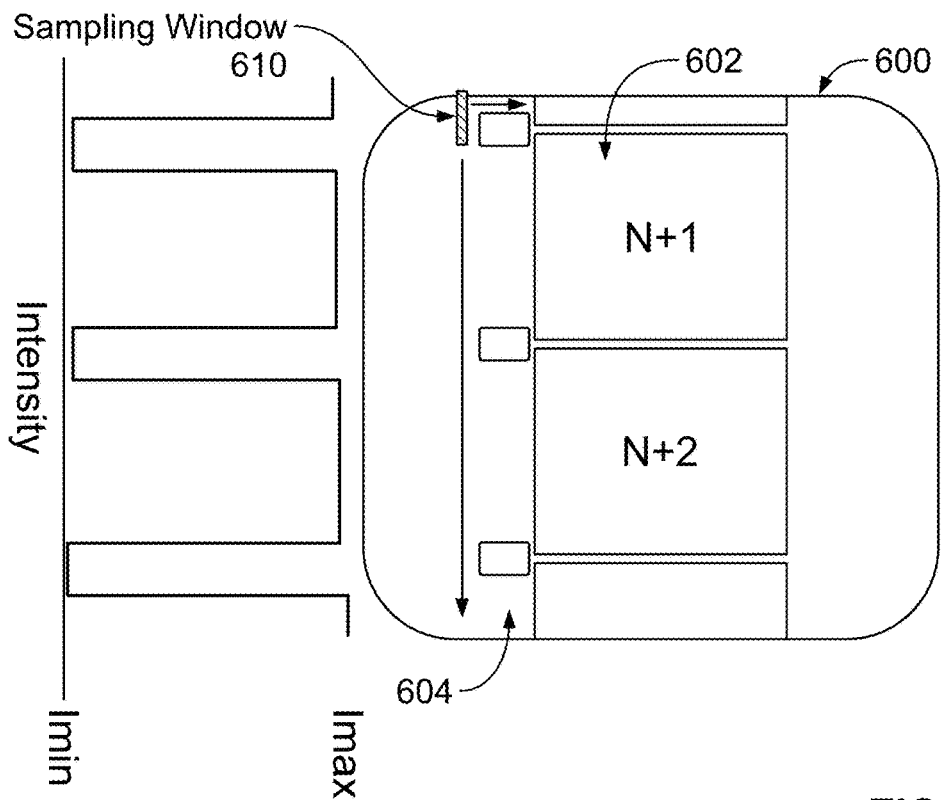
FIG. 6 is a diagram illustrating aspects of scanner output analysis.

The height and width of a perf in a 35/32 internegative is around 6 percent of the size of a full optical scan, as shown in FIG. 10; this translates into a captured perf image height of around 428 pixels (roughly 7680 times 0.06) and a width of around 616 pixels. This 428 pixel height can be used as the basis for determining the row number of the central pixel position of each perforation that appears in a particular scan. The method used is shown in FIG. 6 and relies on the fact that each (hollow) perf will scan in as a darker region (relative to any non-perf information) than other film substrate content located in the same pixel column as the perf. To find the lowest valued intensities a 2-dimensional light curve is generated that slides a single pixel wide, 428 pixel tall sampling window from the very top of a scan to its very bottom: if the window happens to land exactly on a 428 pixel tall perf it should return a near-zero average light value, as shown to the left in FIG. 6, showing a left-most vertical half of a 35/32 filmstrip 600 including a column of frames 602 and perf column 604.

The light intensity curve uses row positions as the X-Axis and average pixel values (an average of some N . . . N+427 row pixel values, N varying from 0+halfperf_length to 7680-halfperf_length) as the Y-Axis for any given perf candidate pixel column. The rolling sample window 610 shown in FIG. 6 starts at row position 214 (==428/2) and continues downward one pixel at a time until it reaches the bottommost perf row 7466 (==(7680−428/2)). The curve thus will contain 7252 (7680−428) samples and can be run thru a maxima/minima analyzer to determine where the lowest average light values are. An overall minimum is also recorded and used to filter out false bottoms: perf minima not within five percent of the absolute lowest minima value in a single scan are discarded, which can often be the case at the top or bottom of scan where only partial (cutoff) perfs have been recorded. In various implementations, the sampling window can be moved vertically downward by more than 1 pixel at a time, such as, for example, by 2, 3, 5, 10, 15, 20, 25, 50 or any number in a range between any of these numbers.

Figure 1C:
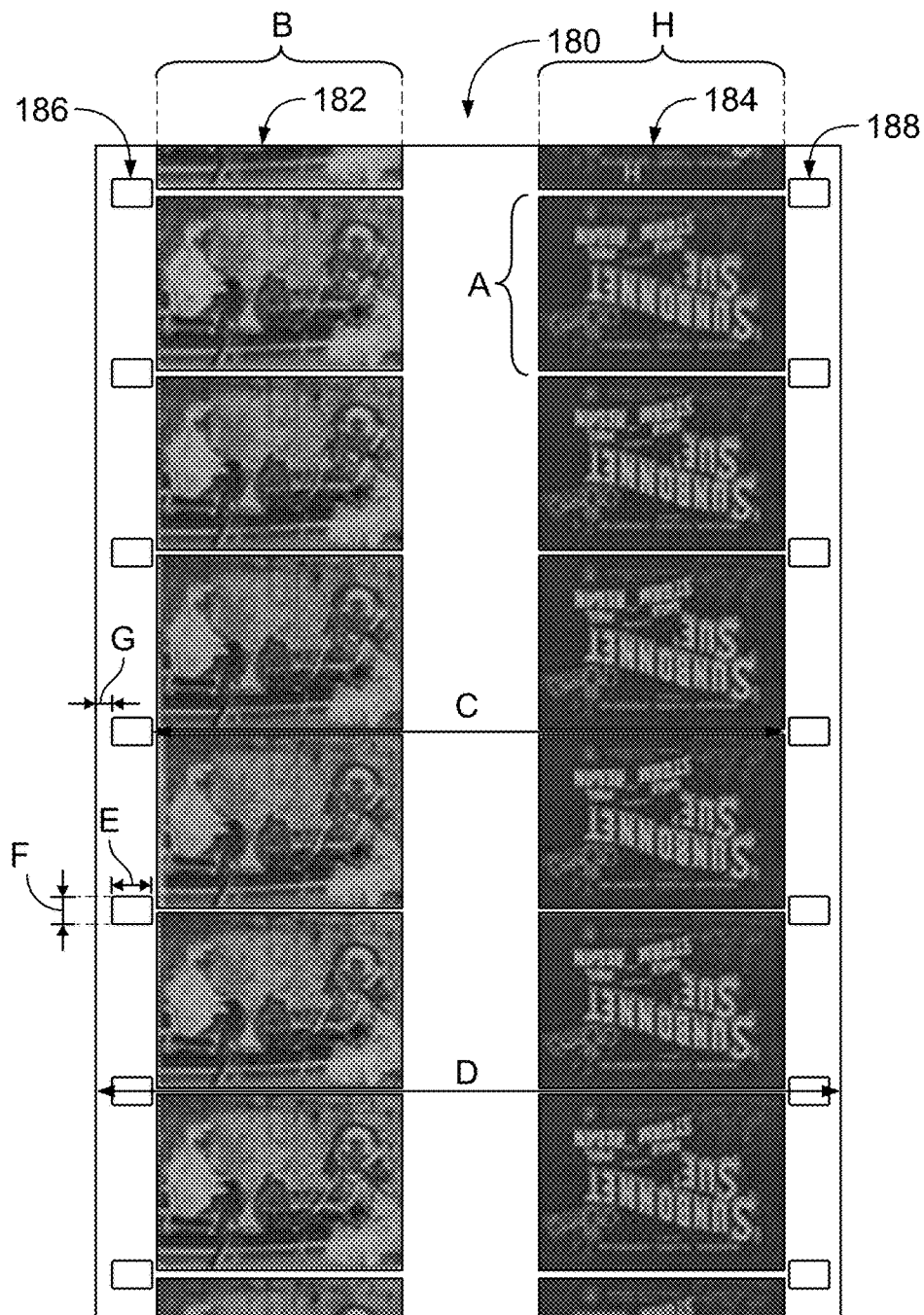
FIG. 1C is an annotated image illustrating elements and dimensions of 35/32 internegative motion picture film.

Curve analysis by the image processor should result in either exactly two or three perf row positions being captured per scan, at a distance apart of roughly 3000 pixels apart (see FIG. 1C; it's the approximate pixel distance between perf centers). If more or less than two/three perfs are observed, or if the distance between two perfs captured is much smaller or much larger than 3000 (again a five percent threshold is used to determine outliers) then a post-pass may be used after all curve minima have been found in a scan to correct and artificially substitute in "missing" perfs. This situation often occurs when perfs are damaged and are not detected by the rolling window and will attempt to approximate a scanner's motor transport speed through interpolation of the perf positions of the previous scan and current scan. In extreme cases where no perfs are detected then the rolling window technique can be used directly on the right edge of a scan in order to determine perf row position, although this technique also requires some extra triangulation with known perf positions due to the fact that film sometimes weaves when passing through the cadenceless scanner, causing a vertical displacement to occur in the scan from left edge to right edge.

To speed up rolling window analysis a simple subtract/add of the 0th pixel and N+428th pixel is also performed, so that no more than three math operations are executed for any row position. That is, there is no need to always add 428 pixel values to come up with a sum. Instead, the image processor only needs to subtract off the 0th pixel from the previously saved window sum while adding in the new rolling 428th pixel to get the new sum for the current window). Integer math is also exclusively used to greatly increase execution speed. The rolling window also currently proceeds one pixel at a time down the length of a scan; in a further refinement this could likely be increased to two or three pixels at a time, trading off a slightly less accurate row position for significantly sped up algorithm execution. Currently columns are sampled at an interval of 25 pixels each, starting from the left edge/scan pixel [column 0 . . . columns 0,25,50, . . . 1000] and the results from each pixel column are used to generate separate pixel intensity curves (note: it is not necessary at this point to calculate horizontal perf alignment or shape; that is left for the final extraction step).

Empirical analysis shows that a column sampling distance of 25 pixels provides a good tradeoff between accuracy and speed. After all rolling windows inside all sample columns have been run, the very lowest valued minima from the set is then used as the row solve location(s). Different scans may in fact have different columns tagged as the darkest; this is fine as film scans may weave from side-to-side and/or have full-sized perfs that are partly damaged, resulting in a 428 pixel tall rolling window being applied over a less than 428 pixel tall scan.

A further speed enhancement is also used to exploit the minimal columnal weave distance occurring from one scan to the next (although a full internegative reel may appear to weave greatly side-to-side, consecutive scans do not actually vary much at all). The column solve position of a previous scan thus is recorded and used to seed the column solve position for the next one, with an offset of 100 pixels left and right used as the bounds. Thus, while a first scan will use 41 sample columns (1000 columns/every 25th pixel+1), subsequent scans will only sample 9 columns (200/25+1), extending a range 100 pixels to the left and to the right of the last scan column solve. A maximum pixel value of 1000 is also used as the maximum left edge column offset, a point that should be well past where a perforation is likely to wander even in the most extreme case(s) of internegative.

Referring again to FIG. 4, at 420, analyzing data using a finate state machine. Analyzing 420 may include, by the image processor 260, determining which of the four states pictured in FIGS. 5A-5D each scanned image is in, and ancillary operations as described in more detail below.

Once perf data has been solved and recorded for each scan—both the number of perfs and perf pixel row offsets—a four-part finite state machine (FSM) may be used to analyze the data. Output from the FSM may consist of a set of rules detailing whether one frame needs extraction (from a two perf or three perf scan), or two frames need extraction (from a three perf scan). In the case of one frame generation from a three perf scan a further instruction is fed into the frame extractor telling it whether to grab only the top frame region between perfs one and two, or the bottom frame region between perfs two and three. A single perf position variable is used to transition between each state of the FSM; it is set upon exit from each state and is then used as an entry condition for the next one.

To initialize the FSM the scanning operator needs to first make sure that the initial capture covers exactly two full perfs (FIG. 5A); this will guarantee that only one frame will be scheduled for extraction and that the perf position variable can be set to an initialized out-of-frame status. The perf position variable is intended to record the bottommost perf location in a three perf scan, so with two perfs this variable can instead be thought of as occurring below scan.

Rules for the FSM have been built around the conceptual scan types in FIGS. 5A-5D:

State 1 (FIG. 5A) will occur anytime exactly one frame is observed within two perfs. The perf position variable need not be checked for this state: instead, the image processor records a single image extraction instruction, covering the region between the bottom perf row and top perf row solve. The exit condition of State 1 is to (re)set the perf position variable to out-of-frame.

In State 2 (FIG. 5B)—where two frames/three full perfs can be seen as visible/captured within the optical scanner window—the image processor checks perf position variable and, if set to out-of-frame, executes State 2. This state is the only one in which a two-frame instruction is sent to the extraction module, with the top two perfs bounding the first frame to extract and the bottom two perfs bounding the second. The exit condition for State 2 is to set the perf position variable to the row value of the bottommost perf.

In State 3 (FIG. 5C)—where two frames/three full perfs can be seen as visible/captured within the optical scanner window—the image processor compares the row position of the bottommost perf and the value of the perf position variable to one another. If the current bottom row position is greater than that of the saved perf position variable (i.e, the bottommost perf in FIG. 5C appears to be shifted upward relative to FIG. 5B), then the image processor executes State 3. The rule for this state is that only the bottom (single) frame should be designated for extraction, using the bottommost two perfs. As with State 2 the exit condition for State 3 is to set the perf position variable to the row value of the bottommost perf.

In State 4 (FIG. 5D)—where two frames/three full perfs can be seen as visible/captured within the optical scanner window—the image processor compares the row position of the bottommost perf and the value of the perf position variable to one another. If the current bottom row position is less than that of the saved perf position variable (i.e., the bottommost perf in FIG. 5D appears to be shifted downward relative to FIG. 5B), then the image processor executes State 4. The rule for this state is that only the top (single) frame should be designated for extraction, using the topmost two perfs. The exit condition for State 4 is actually to reset the perf position variable to out-of-frame (leading to a subsequent state change to either State 1 or State 2; thus, it's not possible for State 3 to follow State 4).

The number of final frames to be extracted will not match the number of DPX scans captured, and will actually grow every time the FSM indicates that two frames need to be extracted from a three perf scan (the rule for State 2). Final extraction stats show that extracted image directories in fact have around thirty percent more files, wherein each file corresponds to an image frame, than do their corresponding scan directories.

Referring again to FIG. 4 at 430, the image processor may extract and stabilize motion picture frames from the scanned images, for example, by more detailed operations as described below.

Output from the FSM may consist of a rules set telling a frame extraction module how to slice 10K scans into either one or two sized frames of 3200 pixel height. However, to prepare the film for archives and achieve an optimal 4400× 3200 pixel frame size, an additional horizontal (width-wise) stabilization is calculated, with a simple gradient analysis extending outward from the center of a perf towards the leftmost perf edge. The extraction module may use independent calculations to identify the top and bottom perf values, and average the findings to determine a proper vertical baseline that will serve as a stabilized edge. The analysis stops when the left edge of a perf has a gradient value that rises to a light intensity value of ten percent above the initial pixel row/column value, i.e, at a point in which the Edge of Perf pixel value starts to approach the darker intensity associated with the left Edge of Film (measurement G of FIG. 10). A left bound of 50 pixels is then subtracted from the yielded intensity point in order to provide a bit of edge material along with the full (left) perforation for archives, and a new rightmost crop position for the extracted frame is simply calculated by adding 4400 to the left boundary. As a final step an upper and lower bound of 100 extra pixels is also applied to the extracted frame (3000 height image+100+100), resulting in a final 4400×3200 pixel sized image that includes both top and bottom visible defining lines between frames.

Figure 7:
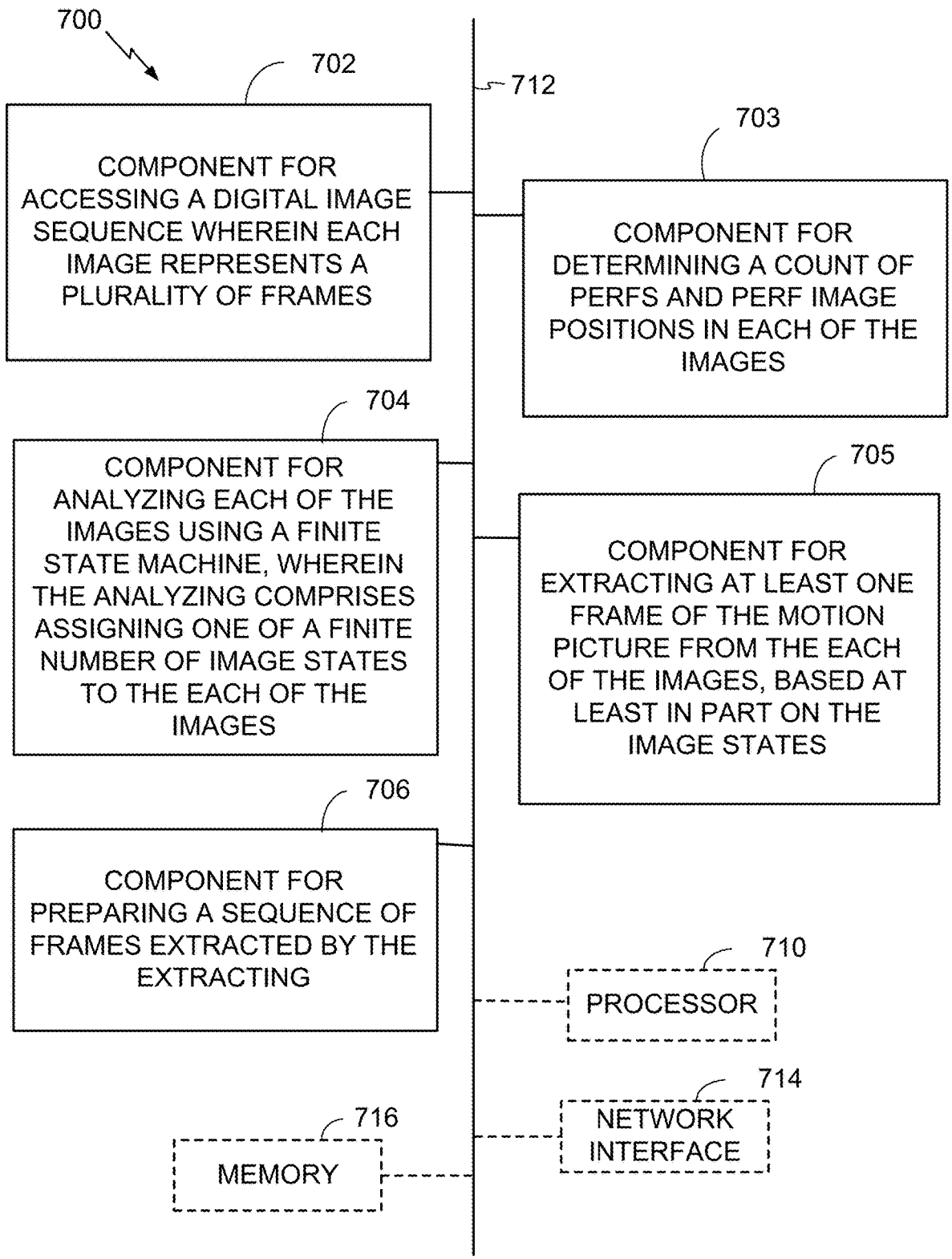
FIG. 7 is a conceptual block diagram illustrating components of an apparatus or system for scanning motion picture film and processing the scanner output to obtain a stabilized image sequence.

In accordance with the foregoing, and by way of additional example, FIG. 7 shows components of an apparatus or system 700 for perfless and cadenceless scanning as described herein, according to one embodiment. As depicted, the apparatus or system 700 may include functional blocks that can represent functions implemented by a processor, software, or combination thereof (e.g., firmware).

As illustrated in FIG. 7, the apparatus or system 700 may comprise an electrical component 702 for accessing a digital image sequence produced by a sprocketless film scanner from motion picture film in a computer memory, wherein images in the sequence include a plurality of frames. The component 702 may be, or may include, a means for said accessing. Said means may include the processor 710 coupled to the memory 716, and to the network interface

714, the processor executing an algorithm based on program instructions stored in the memory. Such algorithm may include a sequence of more detailed operations, for example, accessing a networked storage location via the network interface or local storage via the bus 712 or other coupling, tracking a sequence of scanned images in the networked or local storage, wherein each image is in a sequentially named file or in a data structure including a sequence position indicator, and opening each file or image for processing while maintaining the tracking.

The apparatus or system 700 may further comprise an electrical component 703 for determining a count of perfs and perf image positions in each of the images. The component 703 may be, or may include, a means for said determining. Said means may include the processor 710 coupled to the memory 716, and to a network interface 714, the processor executing an algorithm based on program instructions stored in the memory. Such algorithm may include a sequence of more detailed operations, for example, the operations described in connection with block 410 of FIG. 4 and FIG. 6.

The apparatus or system 700 may further comprise an electrical component 704 for analyzing each of the images using a finite state machine, wherein the analyzing comprises assigning one of a finite number of image states to the each of the images, based at least in part on the count and perf image positions in the each of the images. The component 704 may be, or may include, a means for said analyzing. Said means may include the processor 710 coupled to the memory 716, and to a network interface 714, the processor executing an algorithm based on program instructions stored in the memory. Such algorithm may include a sequence of more detailed operations, for example, the operations described in connection with block 420 of FIG. 4 and FIGS. 5A-5D.

The apparatus or system 700 may further comprise an electrical component 705 for extracting at least one frame of the motion picture from the each of the images, based at least in part on the image states assigned by the analyzing to the each of the images. The component 705 may be, or may include, a means for said extracting. Said means may include the processor 710 coupled to the memory 716, and to a network interface 714, the processor executing an algorithm based on program instructions stored in the memory. Such algorithm may include a sequence of more detailed operations, for example, as described in connection with block 430 of FIG. 4.

The apparatus or system 700 may further comprise an electrical component 706 for preparing a sequence of frames extracted by the extracting sequenced according to the motion picture film. The component 706 may be, or may include, a means for said preparing. Said means may include the processor 710 coupled to the memory 716, and to a network interface 714, the processor executing an algorithm based on program instructions stored in the memory. Such algorithm may include a sequence of more detailed operations, for example, storing each processed frame in sequence order based on a tracked scanning sequence, and including a sequence number in the name or other metadata of each file, or storing each frame image in a data structure in association with metadata indicating a sequence order based on the scanning order. Optionally, the algorithm may include identifying duplicate frames extracted from adjoining scans of the scanned image sequence, and excluding the duplicate frames from the output frame sequence, or marking the duplicate frames for further analysis.

The apparatus 700 may optionally include a processor module 710 having at least one processor, in the case of the apparatus 700 configured as an image processor. The processor 710, in such case, may be in operative communication with the modules 702-706 via a bus 712 or other communication coupling, for example, a network. The processor 710 may effect initiation and scheduling of the processes or functions performed by electrical components 702-706.

In related aspects, the apparatus 700 may include a network interface module 714 operable for communicating with other computing nodes over a computer network (e.g., a storage device). In further related aspects, the apparatus 700 may optionally include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-706, and subcomponents thereof, or the processor 710, or the method 300 or 400 and one or more of the additional operations described in connection with these methods. The memory module 716 may retain instructions for executing functions associated with the modules 702-706. While shown as being external to the memory 716, it is to be understood that the modules 702-706 can exist within the memory 716.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C#, JavaScript, or Javan™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method comprising:
accessing, by at least one processor, a digital image sequence produced by a film scanner from motion picture film in a computer memory, wherein images in the sequence include a plurality of frames,
determining, by the at least processor, perf image positions in each of the images;
assigning, by the at least one processor, one of a finite number of image states to the each of the images, based at least in part on the perf image positions in the each of the images;
extracting, by the at least one processor, at least one frame of the motion picture from the each of the images, based at least in part on the image states; and
preparing, by the at least one processor, a sequence of frames extracted by the extracting sequenced according to the motion picture film.

2. The method of claim 1, further comprising stabilizing a common edge of every frame in the sequence of frames.

3. The method of claim 1, wherein the assigning image states is further based on a count of perfs in the each of the images.

4. The method of claim 1, wherein the determining comprises analyzing a curve of average pixel values generated by averaging pixel values over a rolling sample window.

5. The method of claim 4, wherein the at least one processor identifies perf locations corresponding to minima of the average pixel values.

6. The method of claim 4, wherein the at least one processor locates the rolling window relative to the width of the motion picture film at least in part based on an immediately prior one of the each of the images.

7. The method of claim 1, wherein which frame is extracted from each image depends on which of the image states is assigned to the each image.

8. The method of claim 1, wherein the at least one processor determines an edge of the extracted frame based on an analysis of an adjacent perf edge.

9. An apparatus comprising at least one processor coupled to a memory, the memory holding program instructions, that when executed by the at least one processor, causes the apparatus to perform:

accessing a digital image sequence produced by a film scanner from motion picture film in a computer memory, wherein images in the sequence include a plurality of frames;

determining a count of perfs and perf image positions in each of the images;

assigning one of a finite number of image states to the each of the images, based at least in part on the perf image positions in the each of the images;

extracting at least one frame of the motion picture from the each of the images, based at least in part on the image states; and preparing a sequence of frames extracted by the extracting sequenced according to the motion picture film.

10. The apparatus of claim 9, wherein the memory holds further instructions for stabilizing a common edge of every frame in the sequence of frames.

11. The apparatus of claim 9, wherein the memory holds further instructions for the determining at least in by analyzing a curve of average pixel values generated by averaging pixel values over a rolling sample window.

12. The apparatus of claim 11, wherein the memory holds further instructions for identifying perf locations corresponding to minima of the average pixel values.

13. The apparatus of claim 11, wherein the memory holds further instructions for locating the rolling window relative to the width of the motion picture film at least in part based on an immediately prior one of the each of the images.

14. The apparatus of claim 9, wherein the memory holds further instructions for the extracting the frame from each image based on which of the image states is assigned to the each image.

15. The apparatus of claim 9, wherein the memory holds further instructions for determining an edge of the extracted frame based on an analysis identifying an adjacent perf edge.

16. A method for obtaining a digital image sequence from analog motion picture film, the method comprising:

scanning the motion picture film thereby obtaining a digital image sequence;

determining, by at least one processor, perf image positions in each of the images;

assigning one of a finite number of image states to the each of the images, based at least in part on the perf image positions in the each of the images; and saving the digital image sequence in a computer memory.

17. The method of claim 16, wherein the scanning uses a scanning window per image larger than a frame size of the motion picture film.

18. The method of claim 17, wherein the scanning window includes at least one row of perfs alongside at least one row of full frames.

19. The method of claim 16, further comprising, by the at least one processor, determining a count of perfs in each of the images; and the assigning one of a finite number of image states to the each of the images is further based at least in part on the count of perfs in the each of the images.

20. The method of claim 16, further comprising, by the at least one processor, extracting at least one frame of the motion picture from the each of the images, based at least in part on which of the image states is assigned to the each of the images.

* * * * *